(12) United States Patent
Dugas et al.

(10) Patent No.: US 8,226,375 B2
(45) Date of Patent: Jul. 24, 2012

(54) WIND POWERED SEA PUMP

(76) Inventors: Patrick J Dugas, Winter Haven, FL (US); Gary A Balinsky, Destin, FL (US)

( * ) Notice: Subject to any disclaimer, the term of this patent is extended or adjusted under 35 U.S.C. 154(b) by 369 days.

(21) Appl. No.: 12/686,647

(22) Filed: Jan. 13, 2010

(65) Prior Publication Data

US 2011/0171040 A1 Jul. 14, 2011

(51) Int. Cl.
*F04B 53/00* (2006.01)
(52) U.S. Cl. .................. 417/61; 417/334; 440/8
(58) Field of Classification Search .............. 417/61, 417/334–336; 440/8
See application file for complete search history.

(56) References Cited

U.S. PATENT DOCUMENTS

| 65,370 | A | * | 6/1867 | Fromm | 440/8 |
|---|---|---|---|---|---|
| 779,320 | A | * | 1/1905 | Samuelson | 416/84 |
| 2,326,757 | A | * | 8/1943 | Casiple | 440/8 |
| 4,553,902 | A | * | 11/1985 | Eberhardt | 417/34 |
| 4,775,340 | A | * | 10/1988 | Sundman | 440/8 |
| 8,038,490 | B1 | * | 10/2011 | Vanderhye et al. | 440/8 |
| 2010/0272579 | A1 | * | 10/2010 | Lo et al. | 417/47 |

* cited by examiner

*Primary Examiner* — Devon C Kramer
*Assistant Examiner* — Thomas Fink

(57) ABSTRACT

Wind powers a rotor causing a shaft to rotate, thereby transmitting power to one or more pumps to pump colder subsurface water from the depths, one or more flywheels to provide gyroscopic stability to the entire platform; and to a propeller to help the wind powered sea pump remain in a stationary position. A hull provides a sump for a single hose connector to feed water to the pumps from a pickup hose of desired diameter to a desired depth. The force of the wind powers the sea pump to transport colder water from a lower depth to the sea surface. A sea anchor provides a pivot point to keep the wind powered sea pump oriented directly into the wind and a weather vane helps with the wind orientation as well as providing space for use as an advertising bill board.

20 Claims, 2 Drawing Sheets

WIND POWERED SEA PUMP

TECHNICAL FIELD

The present invention relates to a pump powered by the wind to move colder, nutrient rich water from lower levels in the sea to the surface.

BACKGROUND OF INVENTION

Wind energy has been used in different parts of the world for centuries to pump underground water to the surface. The wind powered sea pump (WPSP) is powered by the wind that turns a circular rotor, which is then converted into reciprocating (up and down) motion that powers one or more cylinder pumps.

SUMMARY OF THE INVENTION

The wind powered sea pump is designed to provide a simple, cost effective, easy to build, device that can be deployed in desired numbers to transfer a relatively large volume of colder, nutrient rich water to the sea surface. Benefits include: cooling the surface temperature of the water to reduce the effects of hurricanes and storms; and improving natural biological processes by bring more nutrients to the surface. The present invention is powered by the wind that engages one or more cylinder pumps. One or more pumps are connected to a sump functioning as a reservoir to feed water to the pumps from a hose of desired diameter to a desired depth. The wind powered sea pump has one or more flywheels that create gyroscopic stability and mechanical inertia.

DETAILED DESCRIPTION OF THE PREFERRED EMBODIMENTS

Figure 1A:
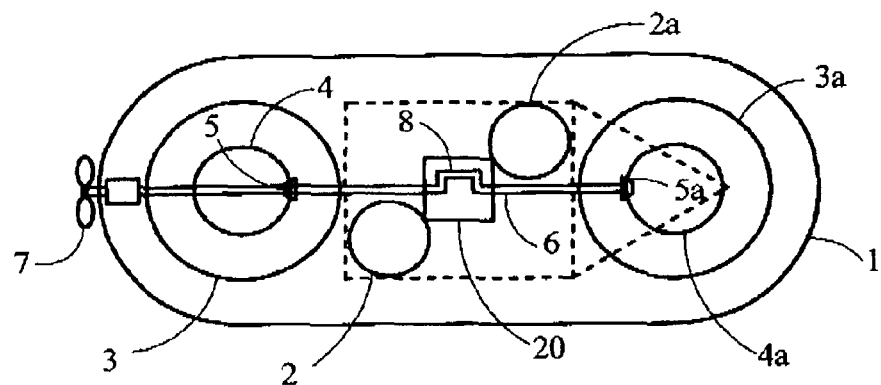
FIG. 1a shows a sectional view of the part of the sea pump through a line A-A in FIG. 1 without the graphics panels.
Figure 1:
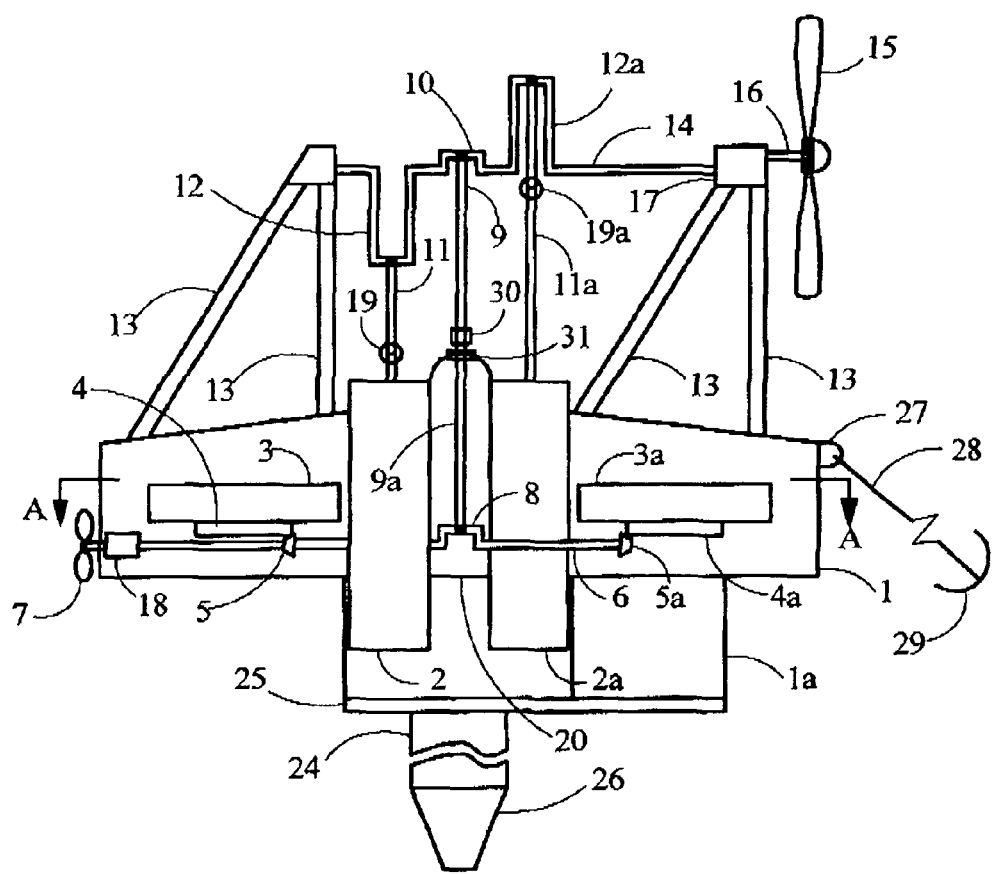
FIG. 1 shows a lateral view of the inside of the sea pump without the graphics panel.

The present invention as shown in FIG. 1 and FIG. 1a comprises rotor 15, powered by the wind, turning shaft 16 into gearbox 17. Gearbox 17 slows the rotation into shaft 14 and contains a positive locking roller stop (patent application Ser. No. 12/503,053) which allows rotation in one direction only so that shaft 14 can continue to rotate even when rotation of the rotor is disrupted.

Shaft 14 is mounted on framing 13 from hull 1 and connected to cams 10 and 12. Hull 1 is a sealed containment which houses shaft 6 with lower cam 8 connected to upper cam 10 by rod 9, coupler 30 and rod 9a through seal 31 inside of enclosure 20, that drains into sump 1a. Gears 5 and 5a on shaft 6 engage gears 4 and 4a to rotate flywheels 3 and 3a to maintain gyroscopic stability and mechanical inertia. The preferred embodiment would use variable inertia flywheels (patent application Ser. No. 11/833,611). Shaft 6 connects to gearbox 18, which increases the rotational speed to propeller 7 to offset the force of the wind pushing back the WPSP.

Cams 12 and 12a are connected to pumps 2 and 2a through rods 11 and 11a and universal joints 19 and 19a. Lower hull 1a provides a sump for a single hose 24 and strainer 26 of desired diameter to a desired depth to feed water to pumps 2 and 2a. Ballast 25 is at the bottom of the sump for flotation stability. A sea anchor 29 is attached to the hull 1 with a rope 28 through a bow eye 27 to keep the WPSP oriented into the wind.

Figure 2A:
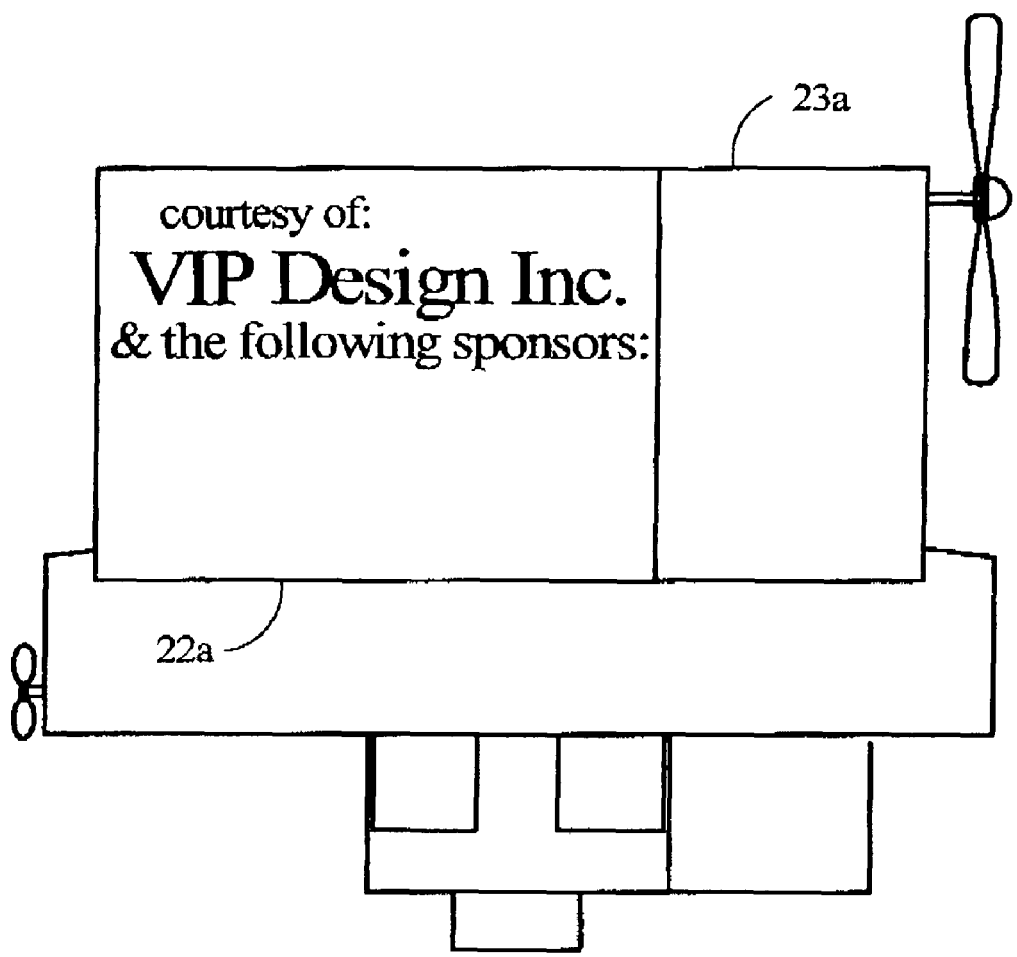
FIG. 2a is an elevation view of the WPSP showing the graphic panels.
Figure 2:
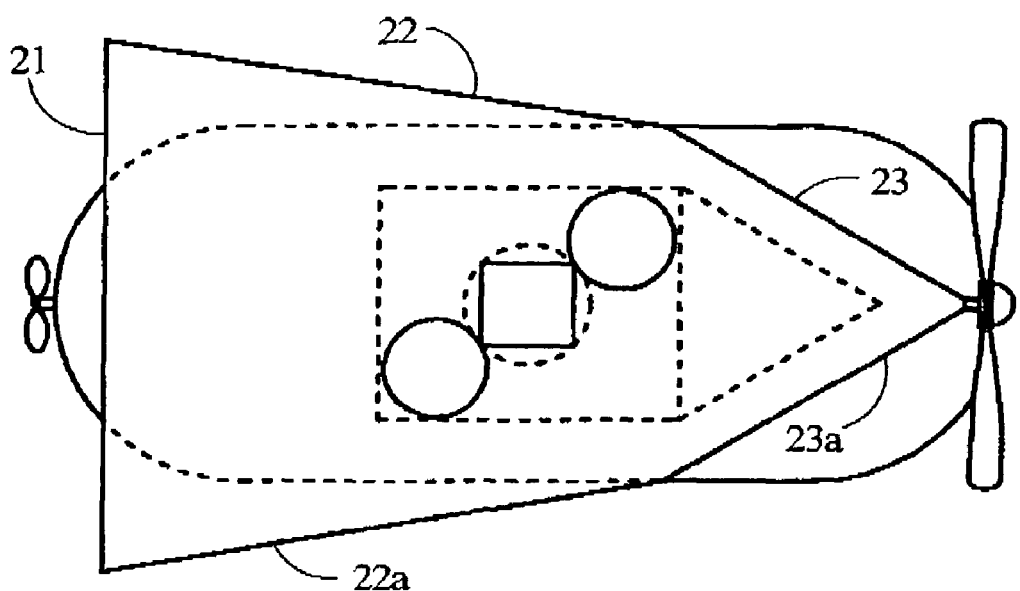
FIG. 2 shows a plan view of the sea pump graphics panels.

FIG. 2 and FIG. 2a show the upper housing and graphic portion of the WPSP comprised of back panel 21, side panels/weather vane 22 and 22a, and front panels/weather vane 23 and 23a.

What is claimed is:

1. A wind powered sea pump comprising:
a float stabilized platform;
a hull formed on the float stabilized platform, the hull having a sump;
an anchor system attached to the hull to keep the wind powered sea pump oriented into the wind;
a pickup hose connected to the sump and extending downward to a desired depth;
a frame for supporting a first rotating mechanism, the first rotating mechanism comprising:
a rotor configured to be rotated by the wind;
a first shaft rotated by the rotor;
a first camshaft rotated by the first shaft; and
a plurality of pumps configured to pump liquid upward through the pickup hose and into the sump;
each pump being powered by the first camshaft via a first connecting rod;
a sealed enclosure which houses a second rotating mechanism, the second rotating mechanism comprising:
a second camshaft;
a plurality of flywheels rotated by the second camshaft, the flywheels configured to maintain gyroscopic stability of the wind powered sea pump, and also maintain mechanical inertia; and
a second gearbox rotated by the second camshaft, the second gearbox configured to produce an output speed greater than an input speed provided by the second camshaft;
a second connecting rod extending from the first camshaft to the second camshaft via the sealed enclosure to transfer power from the first camshaft to the second camshaft; and
a propeller rotated by the second gearbox at the increased output speed, the propeller configured to help the wind powered sea pump remain in a stationary position.

2. The wind powered sea pump of claim 1, wherein one or more panels are configured as a weather vane on an outer portion of the hull.

3. The wind powered sea pump of claim 2, wherein the panels provide a surface for advertising.

4. The wind powered sea pump of claim 1, wherein the pumps are displacement pumps, or reciprocating pumps.

5. The wind powered sea pump of claim 3, wherein the anchor system comprises a bow eye, a rope, and a sea anchor attached to the hull.

6. The wind powered sea pump of claim 5, wherein the bow eye, rope, and sea anchor create a pivot point for the weather vane.

7. The wind powered sea pump of claim 1, further comprising a ballast for stability disposed below the sump.

8. The wind powered sea pump of claim 1, further comprising a first gearbox rotatably disposed between the first shaft and the first camshaft, the first gearbox comprising positive locking roller stops which provide an emergency disconnection of power when an outside force interrupts the rotor and which allow rotation in one direction only so the first camshaft can continue to rotate even if the rotation of the rotor is disrupted.

9. The wind powered sea pump of claim 1, further comprising a strainer which acts as a protector to keep the pickup hose from becoming clogged with unwanted materials.

10. The wind powered sea pump of claim 1, wherein the first connecting rod comprises first rod segments joined via a universal joint; the second connecting rod comprises a plurality of second rod segments coupled via a flexible coupler; the second connecting rod extends from the first camshaft to the second camshaft via a seal in the sealed enclosure; and the flywheels are rotated by the second camshaft via gears.

11. The wind powered sea pump of claim 1, wherein the wind powered sea pump is configured to pump colder water from a particular depth to the sea surface.

12. A method of pumping colder water from a particular depth to the sea surface comprising the steps of:
    providing a wind powered sea pump comprising:
    a float stabilized platform;
    a hull formed on the float stabilized platform, the hull having a sump;
    an anchor system attached to the hull to keep the wind powered sea pump oriented into the wind;
    a pickup hose connected to the sump and extending downward to a desired depth;
    a frame for supporting a first rotating mechanism, the first rotating mechanism comprising:
    a rotor configured to be rotated by the wind;
    a first shaft rotated by the rotor;
    a first camshaft rotated by the first shaft; and
    a plurality of pumps configured to pump liquid upward through the pickup hose and into the sump;
    each pump being powered by the first camshaft via a first connecting rod;
    a sealed enclosure which houses a second rotating mechanism, the second rotating mechanism comprising:
    a second camshaft;
    a plurality of flywheels rotated by the second camshaft, the flywheels configured to maintain gyroscopic stability of the wind powered sea pump, and also maintain mechanical inertia; and
    a second gearbox rotated by the second camshaft, the second gearbox configured to produce an output speed greater than an input speed provided by the second camshaft;
    a second connecting rod extending from the first camshaft to the second camshaft via the sealed enclosure to transfer power from the first camshaft to the second camshaft; and
    a propeller rotated by the second gearbox at the increased output speed, the propeller configured to help the wind powered sea pump remain in a stationary position; and
    operating the wind powered sea pump to pump colder water from a particular depth to the sea surface.

13. The method of claim 12, wherein one or more panels are configured as a weather vane on an outer portion of the hull.

14. The method of claim 13, wherein the panels provide a surface for advertising.

15. The method of claim 12, wherein the pumps are displacement pumps, or reciprocating pumps.

16. The method of claim 14, wherein the anchor system comprises a bow eye, a rope, and a sea anchor attached to the hull.

17. The method of claim 16, wherein the bow eye, rope, and sea anchor create a pivot point for the weather vane.

18. The method of claim 12, further comprising a ballast for stability disposed below the sump, and a strainer which acts as a protector to keep the pickup hose from becoming clogged with unwanted materials.

19. The method of claim 12, further comprising a first gearbox rotatably disposed between the first shaft and the first camshaft, the first gearbox comprising positive locking roller stops which provide an emergency disconnection of power when an outside force interrupts the rotor and which allow rotation in one direction only so the first camshaft can continue to rotate even if the rotation of the rotor is disrupted.

20. The method of claim 12, wherein the first connecting rod comprises first rod segments joined via a universal joint; the second connecting rod comprises a plurality of second rod segments coupled via a flexible coupler; the second connecting rod extends from the first camshaft to the second camshaft via a seal in the sealed enclosure; and the flywheels are rotated by the second camshaft via gears.

* * * * *